United States Patent [19]

Furukawa et al.

[11] Patent Number: 5,267,492
[45] Date of Patent: Dec. 7, 1993

[54] DEVICE FOR CONTROLLING AN AUTOMATIC AUTOMOTIVE TRANSMISSION

[75] Inventors: Hideo Furukawa; Yutaka Ohyama, both of Saitama, Japan

[73] Assignee: Honda Giken Kogyo Kabushiki Kaisha, Tokyo, Japan

[21] Appl. No.: 767,317

[22] Filed: Sep. 30, 1991

[30] Foreign Application Priority Data

Oct. 2, 1990 [JP]  Japan .................. 2-264470
Sep. 2, 1991 [JP]  Japan .................. 3-248377

[51] Int. Cl.⁵ .......................................... B60K 41/06
[52] U.S. Cl. .......................................... 74/866; 74/863
[58] Field of Search .............. 74/863, 866; 364/424.1

[56] References Cited

U.S. PATENT DOCUMENTS

| | | | |
|---|---|---|---|
| 4,698,763 | 10/1987 | Smyth | 74/866 X |
| 4,712,452 | 12/1987 | Hibino et al. | 74/863 X |
| 4,718,309 | 1/1988 | Moriya | 74/866 |
| 4,930,374 | 6/1990 | Simonyi et al. | 74/866 |
| 4,977,797 | 12/1990 | Aoki et al. | 74/866 |
| 4,996,893 | 3/1991 | Nakamura et al. | 74/866 |
| 5,051,905 | 9/1991 | Yoshida | 74/866 X |

FOREIGN PATENT DOCUMENTS 1-295062  11/1989  Japan .

Primary Examiner—Leslie A. Braun
Assistant Examiner—Benjamin Levi
Attorney, Agent, or Firm—Armstrong, Westerman, Hattori, McLeland & Naughton

[57] ABSTRACT

In an automatic automotive transmission system having a torque converter and a gear transmission unit, the gear transmission unit is shifted from one speed stage to another normally according to current vehicle speed and engine load, but is upshifted from one speed stage to a subsequent speed stage according to a vehicle speed and a stored value of the engine load at the time of the preceding upshift so that a series of upshifts may be carried out at regular intervals, and the vehicle operator may accomplish a smooth acceleration of the vehicle substantially without any efforts even when the engine load wavers from the level at the time when the preceding upshift took place.

7 Claims, 5 Drawing Sheets

Fig. 3a
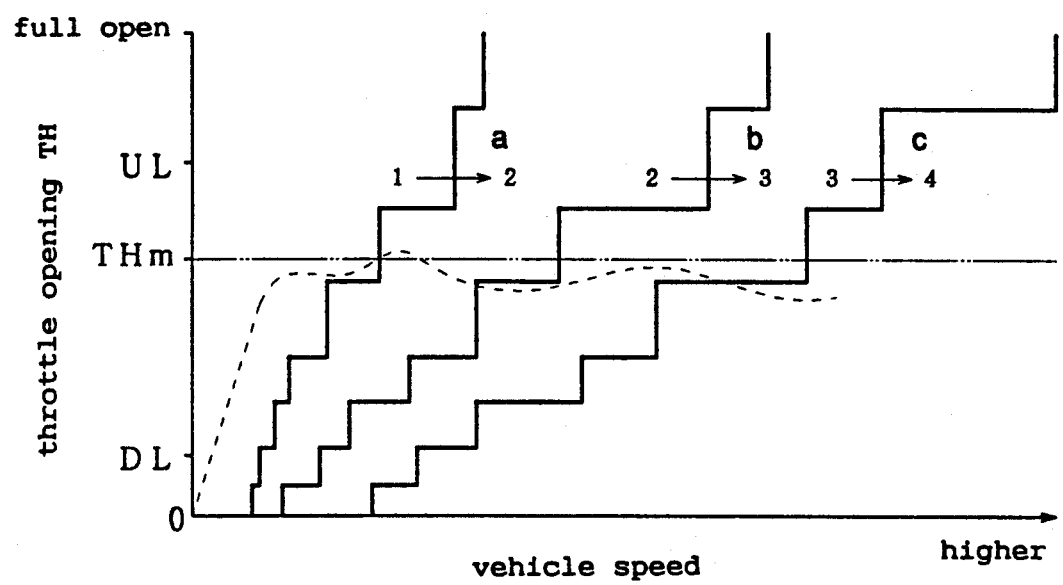
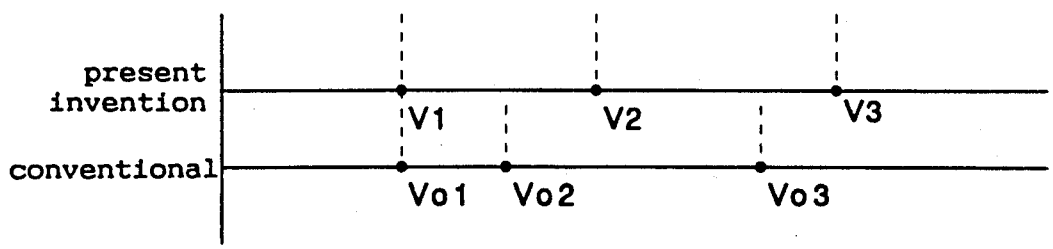
Fig. 3b

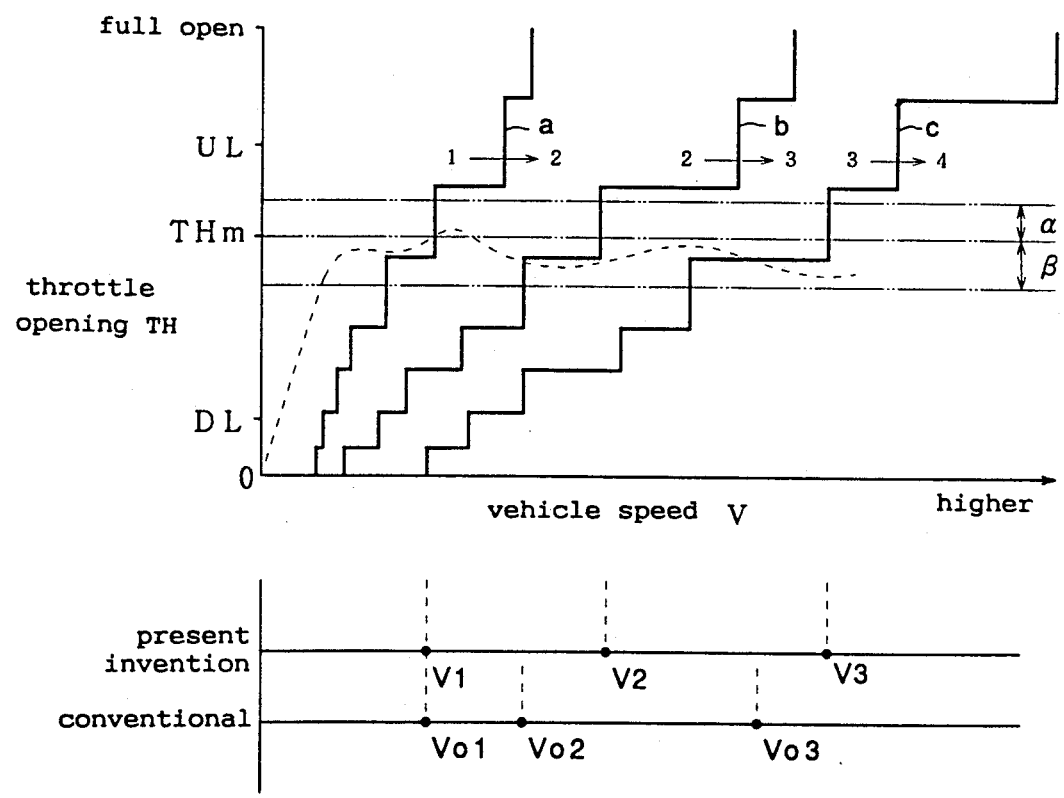

DEVICE FOR CONTROLLING AN AUTOMATIC AUTOMOTIVE TRANSMISSION

TECHNICAL FIELD

The present invention relates to a control device and method for automatically controlling the operation of an automatic automotive transmission system.

BACKGROUND OF THE INVENTION

Automatic transmission systems are widely used in automotive vehicles, and the shifting operation of the transmission is automatically carried out according to various operating conditions of the vehicle in such transmission systems. Typically, as disclosed in Japanese patent laid open publication (kokai) No. 1-295062, the upshift of the transmission takes place according to a certain condition which depends on the vehicle speed and the throttle opening representing the load of the engine, and the speed at which the upshift takes place is raised as the load on the engine is increased. The condition for the upshift from each of the speed stages of the transmission system is indicated by the solid lines in FIG. 3.

In a vehicle equipped with such an automatic transmission system having such operation characteristics, the operator of the vehicle typically steps on the accelerator pedal by a certain amount in start-off, and maintains the accelerator pedal at a fixed position once a desired acceleration is achieved or a desired speed has been reached. The upshift of the transmission system typically takes place after the accelerator pedal is kept substantially stationary, and the speed stage of the transmission is shifted automatically from the first stage to the second, third and the fourth stages in a sequential manner. At such a time, even when the vehicle operator tries to keep the pedal position stationary, if there is a slight changes in the position of the accelerator pedal, the throttle opening changes accordingly as indicated by the broken line in FIG. 3. Thus, as indicated by white circles at vehicles speeds Vo1 to Vo3, the upshifts take place at uneven intervals. However, such an upshift pattern causes an disagreeable impression on the vehicle operator.

BRIEF SUMMARY OF THE INVENTION

In view of such problems of the prior art, a primary object of the present invention is to provide a control device and method for controlling an automatic automotive transmission system which allows upshifts to take place in an agreeable time sequence.

A second object of the present invention is to provide a method and a device for controlling an automatic automotive transmission system which allows the vehicle to be accelerated in a highly smooth fashion.

According to the present invention, such an object can be accomplished by providing a device for controlling an automatic automotive transmission system including a gear transmission unit, the gear transmission unit having at least four speed stages, comprising: engine load detecting means for detecting an engine load, which may be represented by throttle opening or a negative pressure in the intake passage of an internal combustion engine; vehicle speed detecting means for detecting a vehicle speed; automatic gear shift means for shifting the gear transmission unit from one speed stage to another according to outputs from the engine load detecting means and the vehicle speed detecting means; and memory means for storing an output from the engine load detecting means when an upshift of the gear transmission unit from a low speed stage to an intermediate speed stage takes place; the automatic gear shift means having an operation mode in which the gear transmission unit is upshifted from the intermediate speed stage to higher speed stages according to a current output from the vehicle speed detecting means and an output stored in the memory means at least in a certain operating condition of an internal combustion engine.

Thus, even when the engine load wavers from the level at the time when the first upshift or the upshift from the low speed stage to the intermediate speed stage took place, since the subsequent upshifts will be carried out according to the stored value of the engine load, the upshifts will be carried out substantially at regular intervals, and the vehicle operator can accomplish a smooth acceleration of the vehicle substantially without any efforts.

The afore-mentioned operating condition may be that the engine load is within a certain range between upper and lower limits, or that the engine load remains within a certain band defined each above and below the output stored in the memory means. Also, such a control mode may be cancelled when storage of an output in the memory means is not followed by a subsequent upshift within a prescribed time period as detected by the timer means or when an upshift of the gear transmission unit is not followed by a subsequent upshift within a prescribed time period as detected by the timer means.

The present invention further provides a method for controlling an automatic automotive transmission system including a gear transmission unit, the gear transmission unit having at least four speed stages, comprising the steps of: detecting an engine load: detecting a vehicle speed; storing a current engine load in storage means when an upshift of the gear transmission unit from a low speed stage to an intermediate speed stage takes place; and shifting the gear transmission unit from one speed stage to another according to a current engine load and a current vehicle speed under normal condition, but upshifting the gear transmission unit from the intermediate speed stage to higher speed stages according an output stored in the storage means and a current vehicle speed at least under a certain special condition.

BRIEF DESCRIPTION OF THE DRAWINGS

Now the present invention is described in the following with reference to the appended drawings, in which:

FIG. 3A and 3B are diagrams comparing the operation of the first embodiment with that of the prior art;

FIG. 5 is a diagram similar to FIG. 3 for showing the operation of the second embodiment.

DETAILED DESCRIPTION OF THE PREFERRED EMBODIMENTS

Figure 1:
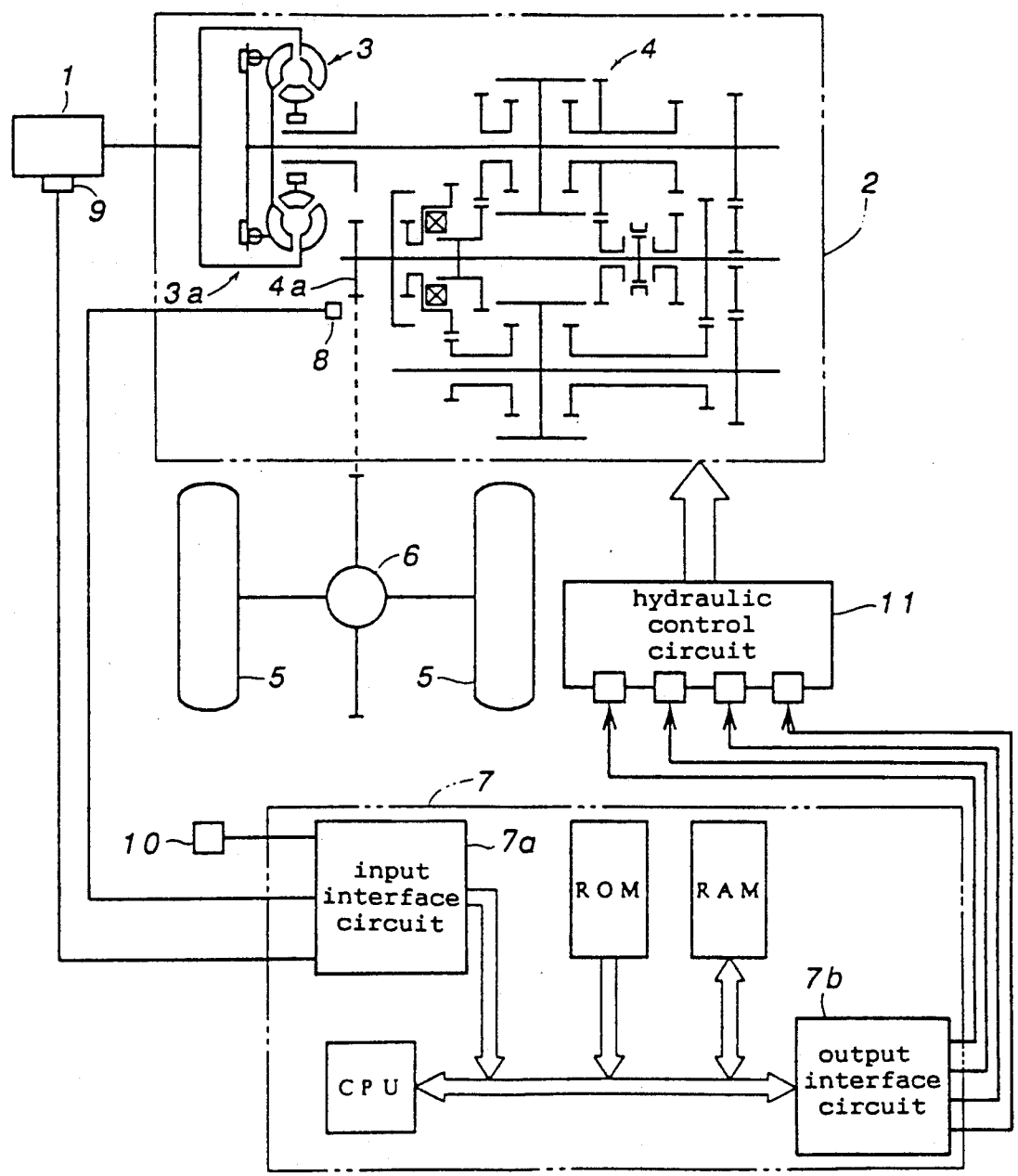
FIG. 1 is a diagram showing the outline of the automatic transmission system to which the present invention is applied.

Referring to FIG. 1 which is a schematic view showing an automatic automotive transmission system to which the present invention is applied, an automatic transmission system 2 is attached to an internal combustion engine 1, and this automatic transmission system comprises a torque converter 3 having a lock-up clutch 3a and a gear transmission unit 4 with four forward speed stages and one reverse speed stage equipped with a hold clutch. A ring gear of a differential gear unit 6 coupled to driven wheels 5 meshes with a final drive gear 4a of the gear transmission unit 4 so that the output torque of the engine 1 may be transmitted to the driven wheels 5 via the torque converter 3 and the gear transmission unit 4.

The speed stages of the automatic transmission system 2 are controlled by a control unit 7 according to a vehicle speed signal and a throttle opening signal representing the load condition of the engine. The control unit 7 operates electronically, and comprises a CPU, ROM, RAM and input and output interface circuits 7a and 7b. The input interface circuit 7a receives a pulse signal from a vehicle speed sensor 8 associated with the final drive gear 4a as a vehicle speed signal, and a voltage signal from a throttle opening sensor 9 mounted on a throttle body not shown in the drawing as a throttle opening signal. The input interface circuit 7a may further receive signals from other sensors 10 which, for instance, detect the condition of an air conditioner, and the temperature of the engine cooling water.

The CPU of the control unit 7 carries out a map control for the operation of the automatic transmission system 2 according to the signals supplied to the input interface circuit 7a. The output interface circuit 7b of the control unit 7 supplies a shift control signal and a lock-up control signal to solenoid valves for shift control and lock-up control of an hydraulic control circuit 11 of the automatic transmission system 2. The hydraulic control circuit 11 automatically shifts the gears of the gear transmission unit 4 of the automatic transmission system 2 as required.

Figure 2:
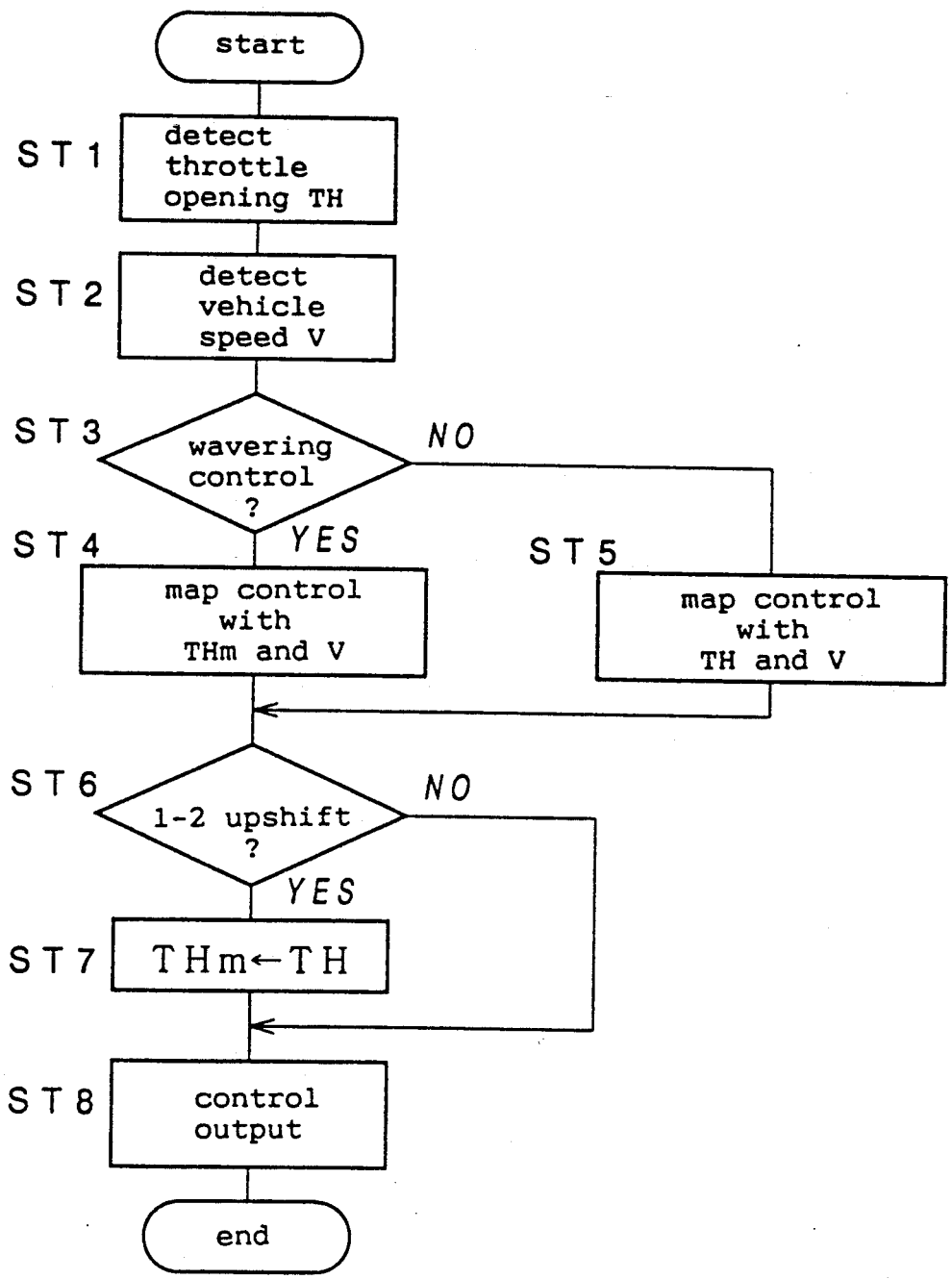
FIG. 2 is a flow chart for illustrating the operation of a first embodiment of the present invention.

Now the operation of this automatic transmission system is described in the following with reference to the flow chart of FIG. 2 showing the control action according to the present invention and the diagram of FIG. 3 showing exemplary transmission characteristics.

Referring to FIG. 2, a throttle opening TH is detected by the throttle opening sensor 9 in step ST1, and a vehicle speed V is detected by the vehicle speed sensor 8 in step ST2. The present invention is intended to allow upshifts to be carried out at substantially even intervals even when the throttle opening TH changes or wavers slightly from a fixed level in an upshift situation where the accelerator pedal is gradually depressed from a stationary condition of the vehicle, and this transmission control action associated with the slight changes in the throttle opening TH is called wavering control hereinafter.

In step ST3, it is determined if a condition for cancelling the wavering control exists or not. If the wavering control has not been started, if the throttle opening falls out of a range extending between upper and lower limits (UL and DL in FIG. 3), or if the condition for carrying on the wavering control is otherwise not satisfied, the program flow advances to step ST5 to carry out the conventional map control. However, if the wavering control is already in progress, the program flow advances from step ST3 to step ST4 to carry on the wavering control.

The upper and lower limits UL and DL are determined because the transmission characteristics of an automatic transmission system are typically determined in such a manner that the spacing between shift lines or the differences in the vehicle speed at the time of each shifting operation with a same throttle opening TH becomes larger as the throttle opening TH is increased, and, when the throttle opening TH is so large as to exceed the upper limit UL, the spacing between the shift lines is so large that the change in the vehicle speed due to the wavering of the throttle opening does not produce any appreciable effect. Also, when the throttle opening TH is smaller than the lower limit DL, the spacing between the shift lines is so small that the wavering of the throttle opening does not cause any appreciable change in the vehicle speeds at which shifting of the gear transmission takes place, and it does not produce any unfavorable or disagreeable impression on the timings of shifting operations. If desired, however, such upper and lower limits UL and DL may be disregarded.

In the map control of step ST5, the transmission system is controlled in conventional manner according to the transmission characteristics depending on the throttle opening TH and the vehicle speed V detected in steps ST1 and ST2, respectively, as indicated by the solid lines in FIG. 3. The transmission characteristics may not be step-wise as illustrated in FIG. 3, but may also be linear or piece-wise linear as desired. According to the transmission characteristics illustrated in FIG. 3, when the vehicle is accelerated with the throttle opening changing as indicated by the broken line, the first to second (1-2) upshift takes place at a vehicle speed V1 which crosses the 1-2 upshift line a according to the throttle opening indicated by the broken line.

It is determined in step ST6 if a 1-2 upshift took place in the preceding control cycle. If a 1-2 upshift took place in the preceding control cycle, the throttle opening TH detected in step ST1 is stored in the memory of the control unit 7 as a reference load THm. If it is determined in step ST6 that there was no upshift operation in the preceding control cycle, or after step ST7 has been carried out, a transmission control operation is actually carried out, in step ST8, according to the results of step ST4 or ST5 as the case may be.

In step ST4, the map control is carried out according to the reference load THm stored in step ST7 and the vehicle speed detected in step ST2. In other words, after an upshift is carried out across the 1-2 shift line a of FIG. 3, the reference load value THm is used in place of the actual throttle opening TH in the subsequent 2-3 and 3-4 upshift operations.

If the throttle opening TH wavers as indicated by the broken line of FIG. 3, in absence of the wavering control of the present invention, the upshifts will take place at uneven intervals as indicated by points Vo1 to Vo3 in FIG. 3. However, with the wavering control of the present invention, the upshifts will take place at equal interval as indicated by the solid circles at points V1 to V3 in FIG. 3. Thus, the upshifts are carried out at even intervals as if there were no wavering in the throttle opening as indicated by the two-dot chain line at TH = THm. Therefore, after a 1-2 upshift is carried out at a certain throttle opening THm, the subsequent 2-3 and 3-4 upshifts are carried out according to the same throttle opening THm without involving any uneven intervals for successive upshifts even when the actual throttle opening may not be constant throughout the process.

According to this embodiment, the wavering control was carried out only when the throttle opening is within a certain range defined by predetermined upper and lower limits UL and DL, but other conditions may be imposed on the system. For instance, it is possible to define a certain band above and below the reference load value THm stored in step ST7 (for instance, the reference load being defined as the throttle opening when the first upshift operation took place), and carry out the wavering control only when the wavering of the throttle opening is confined within these bands regarding it truly as the case of the wavering of the throttle opening. If desired, the bands above and below may have different widths. It is also possible to cancel the wavering control when no upshift takes place within a certain time period after a reference value THm is stored in step ST7. Alternatively, the wavering control may be cancelled when no subsequent upshift takes place within a certain time period after an upshift from a certain speed stage has taken place, for instance because the road turned into an uphill, and the vehicle speed did not increase.

There were four speed stages in the above described embodiment, and the upshift from the first speed stage to the second speed stage was considered as the first upshift operation, but the present invention is not limited by this example. For instance, in a situation where upshifts are carried out from second speed stage to fourth and higher speed stage, it is possible to employ the above described wavering control by considering a 2-3 upshift as a first upshift. Also, when the wavering control is resumed after it was cancelled, the throttle opening at the time of the first upshift operation subsequent to the resumption of the wavering control may be stored as the reference value. The data representing the engine load is not limited to the throttle opening, but may also be the intake negative pressure and other measurable quantities.

Figure 4:
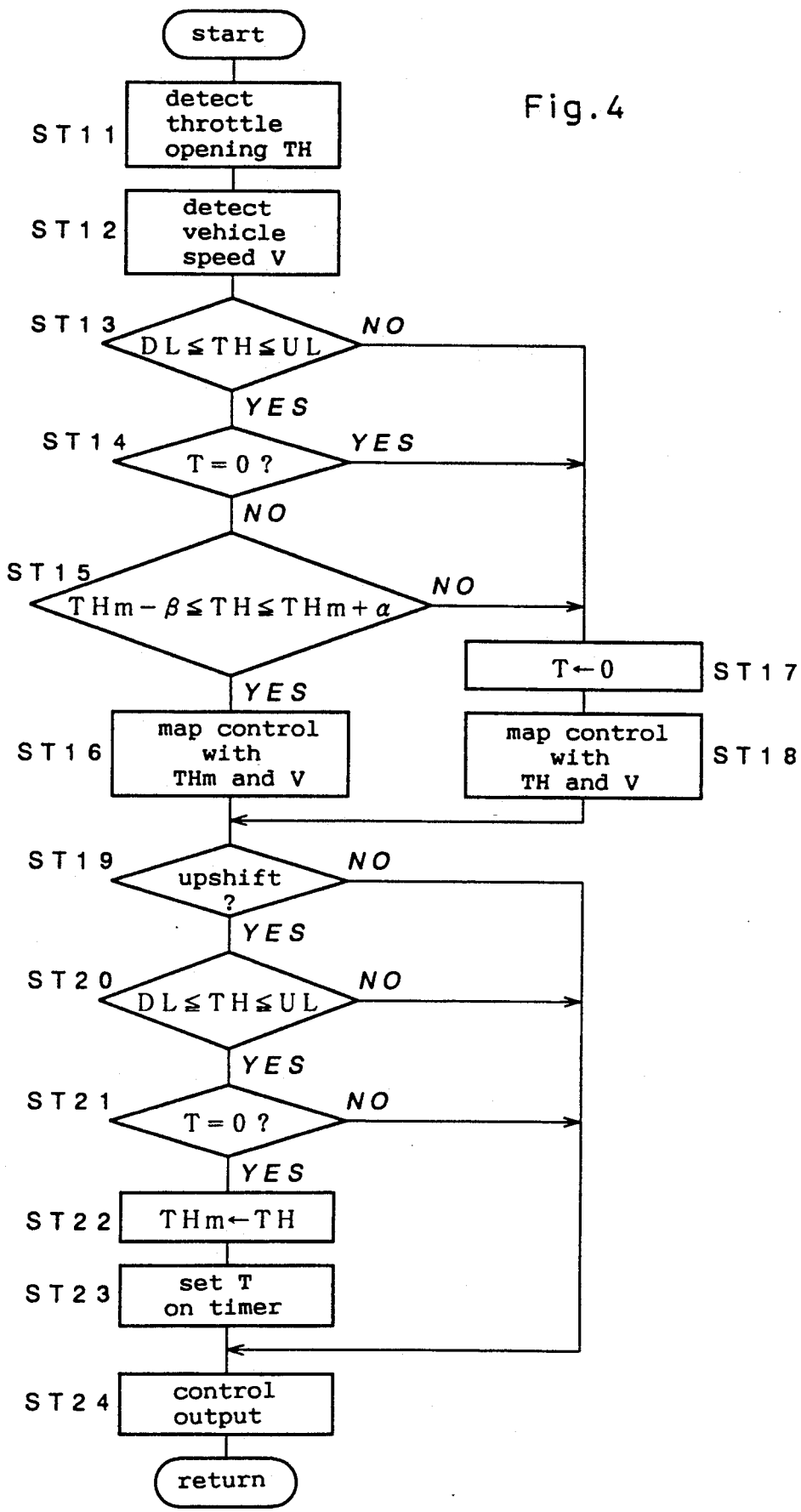
FIG. 4 is a flow chart similar to FIG. 2 for illustrating the operation of a second embodiment of the present invention.

FIGS. 4 and 5 show a second embodiment of the present invention, and FIG. 4 is a flow chart similar to that of FIG. 2 while FIG. 5 is a diagram similar to FIG. 3. The general control flow of this embodiment is similar to that of the first embodiment, but the first upshift is not limited to the 1-2 upshift but expanded to any upshift operation. Further, a slight modification is made to the wavering control.

Referring to FIG. 4, in steps ST11 and ST12, a throttle opening TH and a vehicle speed V are detected in the same way as in steps ST1 and ST2 of the first embodiment. The program flow advances to step ST14 if it is determined in step ST13 that the fluctuation in the throttle opening is confined to the range between the upper and lower limits (UL and DL as indicated in FIG. 5).

It is determined in step ST14 if the time T remaining on the timer which was started at the time of the first upshift is zero or not, and if there is time left on the timer or, in other words, the wavering control is still being maintained, the program flow advances to step ST15 to execute the wavering control. In step ST15, it is determined if the throttle opening TH is within the range extending between THm+$\alpha$ and THm−$\beta$. If the throttle opening is within this range, the program flow advances to step ST16 where the map for the transmission controlled is looked up by using the current vehicle speed and the reference value THm in the same way as in step ST4 of the first embodiment.

Either if the throttle opening TH is outside the range extending between the upper and lower limits UL and DL (ST13), if the time criteria for the wavering control did not meet the condition for executing the wavering control (ST14), or if the throttle opening TH is outside the range extending between THm+$\alpha$ and THm −$\beta$, the program flow advances to step ST17 where the time is reset, and the program further advances to step ST18. In step ST18, the map for the transmission controlled is looked up by using the current vehicle speed and the throttle opening TH in the same way as in step ST5 of the first embodiment.

In step ST19 which follows steps ST16 and ST18, it is determined if an upshift has been made, and the program flow advances to step ST20 in case of an upshift. In step ST20, it is determined if the throttle opening TH is within the range defined by the upper and lower limits UL and DL in the same way as in step ST13. In step ST21, it is determined if the time remaining on the time is zero or not in the same way as in step ST14, and if the timer is up the program flow advances to step ST22.

In step ST22, the throttle opening TH detected in step ST11 is stored as the reference value THm or, in other words, the upshift which has been detected is regarded as the first upshift. In step ST23, the timer is started to monitor the expiration of the predetermined time period given as a condition for maintaining the wavering control. In following step ST24, a transmission control signal is generated according to the map entry looked up in step ST16 or step ST18 before the program flow returns to step ST11.

Either if no upshift was detected in step ST19, if the throttle opening TH was outside the range extending between the upper and lower limits UL and DL in step ST20, or if the timer was not still up in step ST21, the program flow advances to step ST24.

Thus, if the reference value THm at the time of the first upshift is determined in step ST22 and an upshift is made before the time on the timer runs out, the map for the wavering control is looked upon in step ST16 followed by steps ST19 through ST21 and step ST24 in which the wavering control is maintained by using the reference value THm at the time of the first upshift without resetting the reference value THm with the throttle opening of the second or any other subsequent upshift.

Thus, according to the present invention, since upshift operations following a first upshift operation are carried out according to a signal representing the engine load at the time when the first upshift was carried out, the upshift operations are carried out at substantially equal interval even when the throttle opening wavers during these upshift operations. Therefore, the vehicle operator can achieve a smooth acceleration without involving any irregular upshift operations.

Although the present invention has been described in terms of specific embodiments, it is possible to modify and alter details thereof without departing from the spirit of the present invention.

What we claim is:

1. A device for controlling an automatic automotive transmission system including a gear transmission unit, said gear transmission unit having at least four speed stages, comprising:

engine load detecting means for detecting an engine load;

vehicle speed detecting means for detecting a vehicle speed;

automatic gear shift means for shifting said gear transmission unit from one speed stage to another according to outputs from said engine load detecting means and said vehicle speed detecting means; and memory means for storing an output from said engine load detecting means when an upshift of said gear transmission unit from a low speed stage to an intermediate speed stage takes place;

said automatic gear shift means having an operation mode in which said gear transmission unit is upshifted from said intermediate speed stage to higher speed stages according to a current output from said vehicle speed detecting means and said output stored in said memory means at least in a certain operating condition of an internal combustion engine.

2. A device according to claim 1, wherein said engine load detecting means consists of a throttle opening sensor for detecting an opening of a throttle valve of said internal combustion engine.

3. A device according to claim 1, wherein said engine load detecting means consists of an engine vacuum sensor for detecting a negative pressure present in an intake passage of said internal combustion engine.

4. A device according to claim 1, wherein said operating condition is that said engine load is within a certain range between upper and lower limits.

5. A device according to claim 1, wherein said operating condition is that aid engine load remains within a certain band defined each above and below an output stored in said memory means.

6. A device according to claim 1, further comprising timer means, said automatic gear shift means upshifting said gear transmission unit from one speed stage to another strictly according to current outputs from said engine load detecting means and said vehicle speed detecting means when storage of an output in said memory means is not followed by a subsequent upshift within a prescribed time period as detected by said timer means.

7. A device according to claim 1, further comprising timer means, said automatic gear shift means upshifting said gear transmission unit from one speed stage to another strictly according to current outputs from said engine load detecting means and said vehicle speed detecting means when an upshift of said gear transmission unit is not followed by a subsequent upshift within a prescribed time period as detected by said timer means.

* * * * *